HERBERT T. ROBINSON
VERNON H. JUNGJOHANN
WILLIAM P. EWALD
INVENTORS

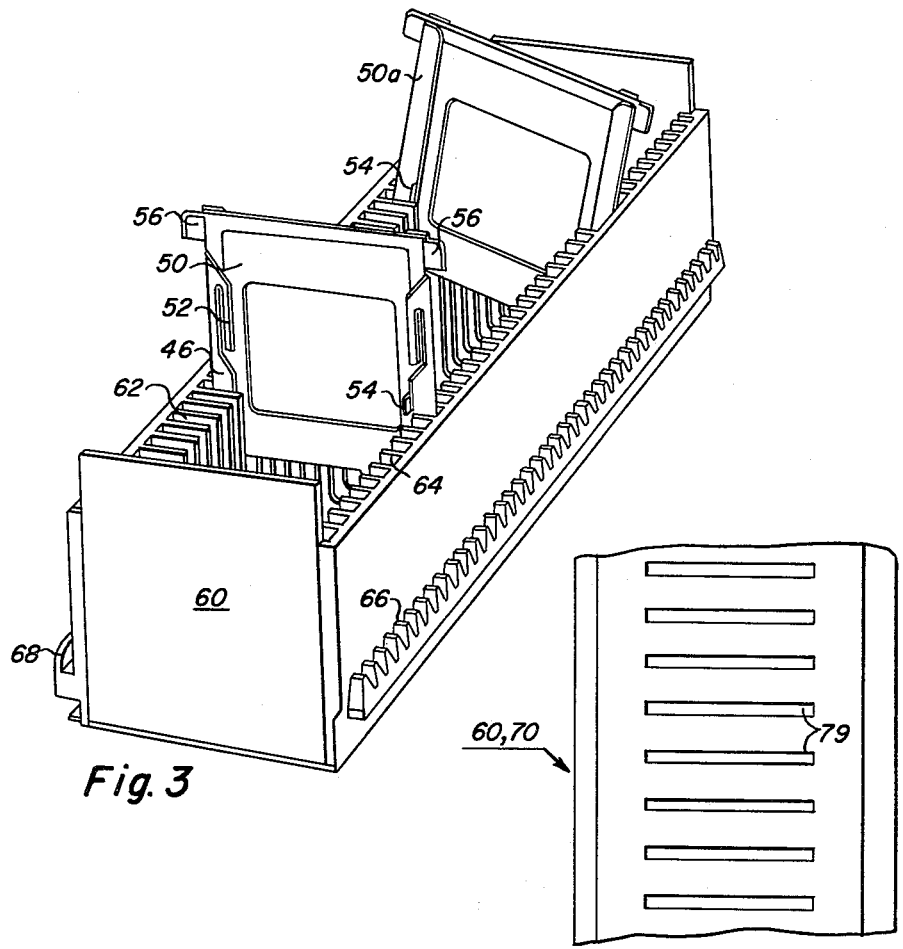
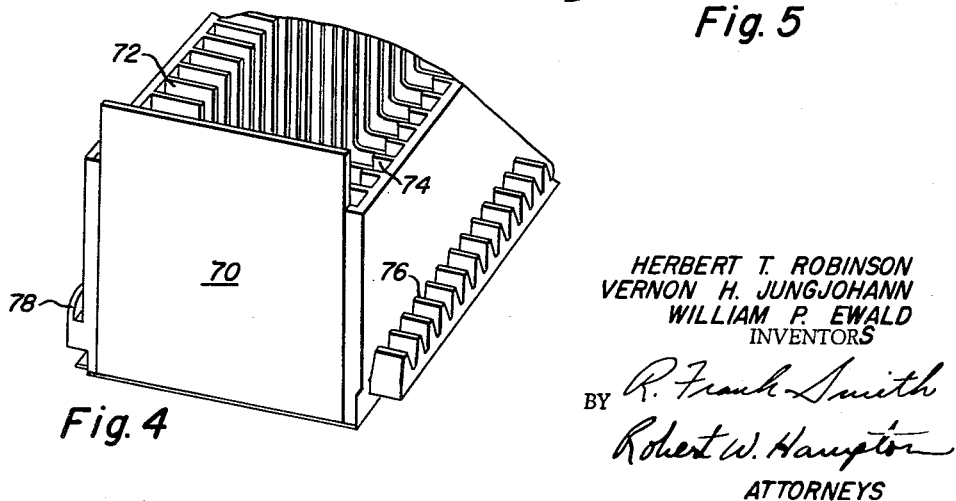

BY R. Frank Smith
Robert W. Hampton
ATTORNEYS

Dec. 26, 1961  H. T. ROBINSON ETAL  3,014,297
SLIDE PROJECTORS
Original Filed Nov. 14, 1957  9 Sheets-Sheet 4

HERBERT T. ROBINSON
VERNON H. JUNGJOHANN
WILLIAM P. EWALD
INVENTORS

BY R. Frank Smith
Robert W. Hampton
ATTORNEYS

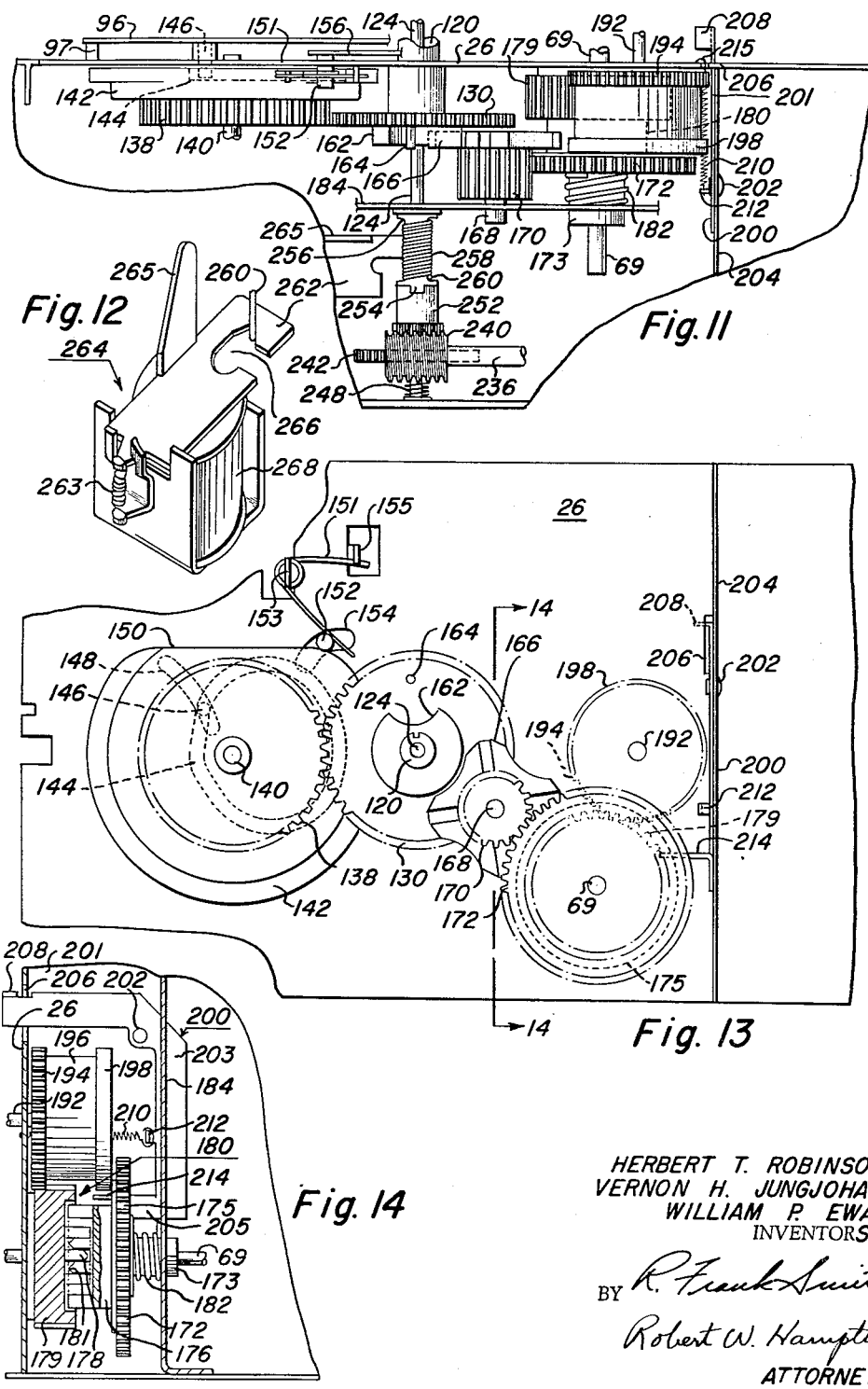

Dec. 26, 1961 H. T. ROBINSON ETAL 3,014,297
SLIDE PROJECTORS
Original Filed Nov. 14, 1957 9 Sheets-Sheet 6

HERBERT T. ROBINSON
VERNON H. JUNGJOHANN
WILLIAM P. EWALD
INVENTORS

BY
ATTORNEYS

HERBERT T. ROBINSON
VERNON H. JUNGJOHANN
WILLIAM P. EWALD
INVENTORS

BY R. Frank Smith
Robert W. Hampton
ATTORNEYS

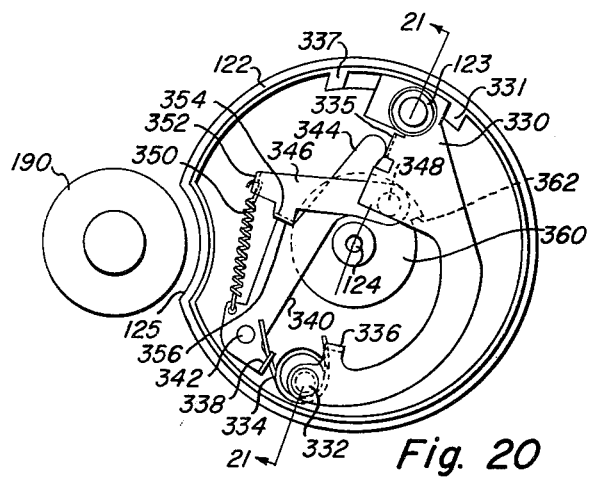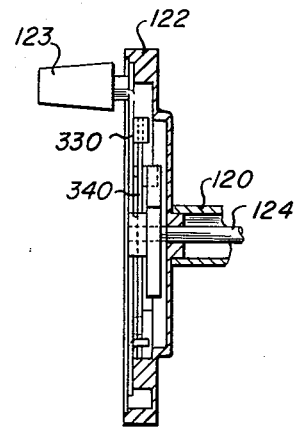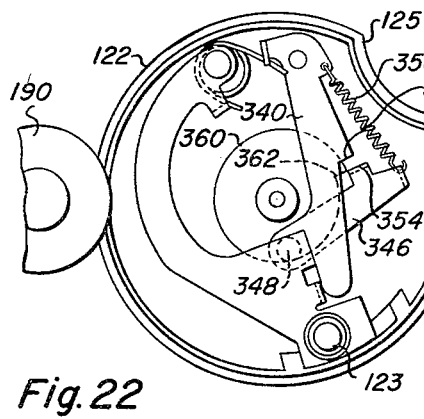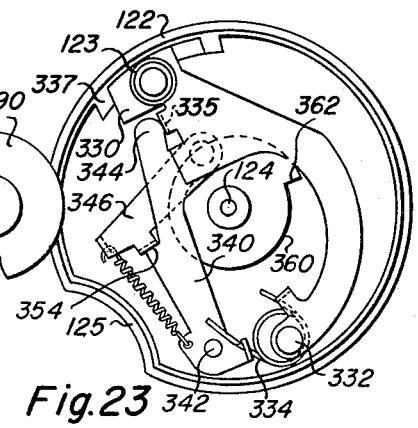

Dec. 26, 1961 H. T. ROBINSON ETAL 3,014,297
SLIDE PROJECTORS
Original Filed Nov. 14, 1957 9 Sheets-Sheet 9
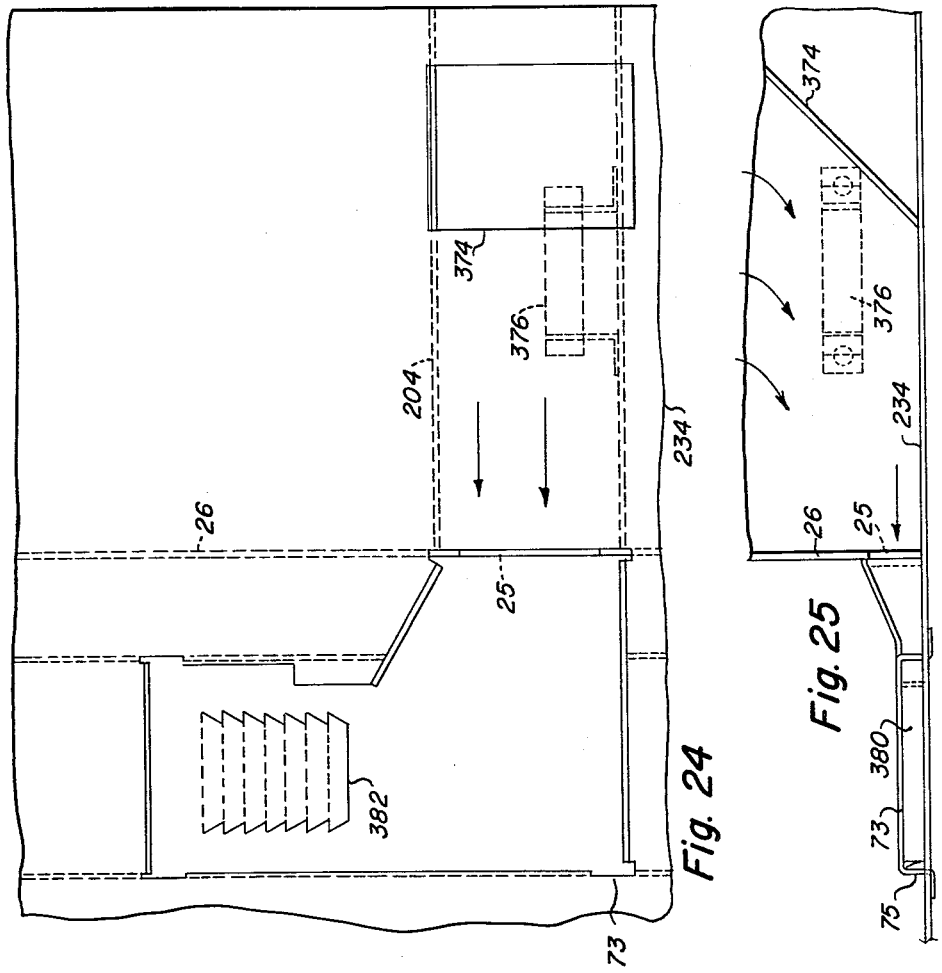
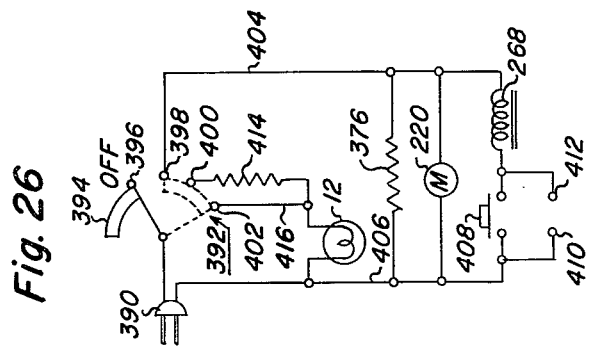
HERBERT T. ROBINSON
VERNON H. JUNGJOHANN
WILLIAM P. EWALD
INVENTORS
BY R. Frank Smith
Robert W. Hampton
ATTORNEYS United States Patent Office 3,014,297
Patented Dec. 26, 1961

3,014,297
SLIDE PROJECTORS
Herbert T. Robinson, Vernon H. Jungjohann, and William P. Ewald, Rochester, N.Y., assignors to Eastman Kodak Company, Rochester, N.Y., a corporation of New Jersey
Original application Nov. 14, 1957, Ser. No. 696,516, now Patent No. 2,969,711, dated Jan. 31, 1961. Divided and this application June 23, 1959, Ser. No. 822,386
2 Claims. (Cl. 40—79)

The present invention concerns slide projectors and more particularly concerns slide projectors that can be operated under either automatic or manual control.

This application is a division of the copending application Serial No. 696,516, filed November 14, 1957, now Patent Number 2,969,711.

Among the foremost objects of the invention is the provision of a slide projector that is adapted to receive slide magazines of different compartment spacings and to automatically index such magazines by incremental distances corresponding to the spacing between successive slide compartments.

Other objects of the invention will appear from the following detailed description, reference being made to the accompanying drawings, wherein:

FIG. 3 is a perspective view of a cardboard-slide magazine;

FIG. 4 is a perspective view of a portion of a glass-slide magazine;

FIG. 5 is a bottom view of a magazine showing the ventilating louvres;

FIG. 11 is a top view of the programming and indexing gear trains;

FIG. 12 is a perspective view of the spring-clutch solenoid;

FIG. 13 is a right side view of the programming and indexing gear trains;

FIG. 14 is a front view, partly in section, of the indexing clutch and its controls taken along line 14—14 of FIG. 13;

FIG. 20 is a left side view of the handcrank clutch in its half-cycle position during forward manual drive;

FIG. 21 is a sectional front view of the mechanism shown in FIG. 20, taken along line 21—21;

FIG. 22 is a left side view of the handcrank clutch in an intermediate position for forward automatic drive, showing the operation of the handcrank when a jam occurs in the machine;

FIG. 23 is a left side view of the handcrank clutch in an intermediate position for reverse manual drive and for manual holding of automatic drive;

FIG. 24 is a bottom view of the preheating duct;

FIG. 25 is a front view of the preheating duct; and

FIG. 26 is a schematic wiring diagram of the electrical circuit in the projector.

GENERAL DESCRIPTION

The slide projector embodying the present invention is adapted to receive trays, or "magazines," of photographic slide transparencies, often called "slides." Such slides are at present divided into two principal classes, viz., (1) those that are mounted between two plates of glass and are called "glass slides"; and (2) those that are mounted between two layers of light-weight cardboard and are called "cardboard slides." In the case of cardboard slides, the layers of cardboard are opaque and are therefore provided with central apertures of suitable size.

Operationally, the glass slides and cardboard slides are distinguished principally by their thickness, such that a magazine of given length is able to accommodate more cardboard than glass slides. In the present case each slide of either type is supported in a slide holder which, in turn, is supported in a compartment of a magazine. Two types of slide holders and magazines are provided and correspond to the two types of slide mounts. The slide holders and the compartments of a glass-slide magazine are relatively thick and are adapted to receive either type of mount, whereas the holders and compartments of a cardboard-slide magazine are relatively thin and are adapted to receive only cardboard slides. The present projector is so constructed that either type of magazine may be inserted therein and is automatically and cyclically advanced, or "indexed," by incremental distances corresponding to the spacing of successive magazine compartments. No adjustment is required in order to change from one type of magazine to the other.

During each slide-changing cycle of the projector a slide holder and its slide transparency are lifted from the magazine by an elevator and placed in a gate where the slide is in the optical axis of the projector. A shutter is removed from the optical axis when a slide holder is fully seated in the gate and is restored to that position prior to removal of the slide holder from the gate.

Figure 6:
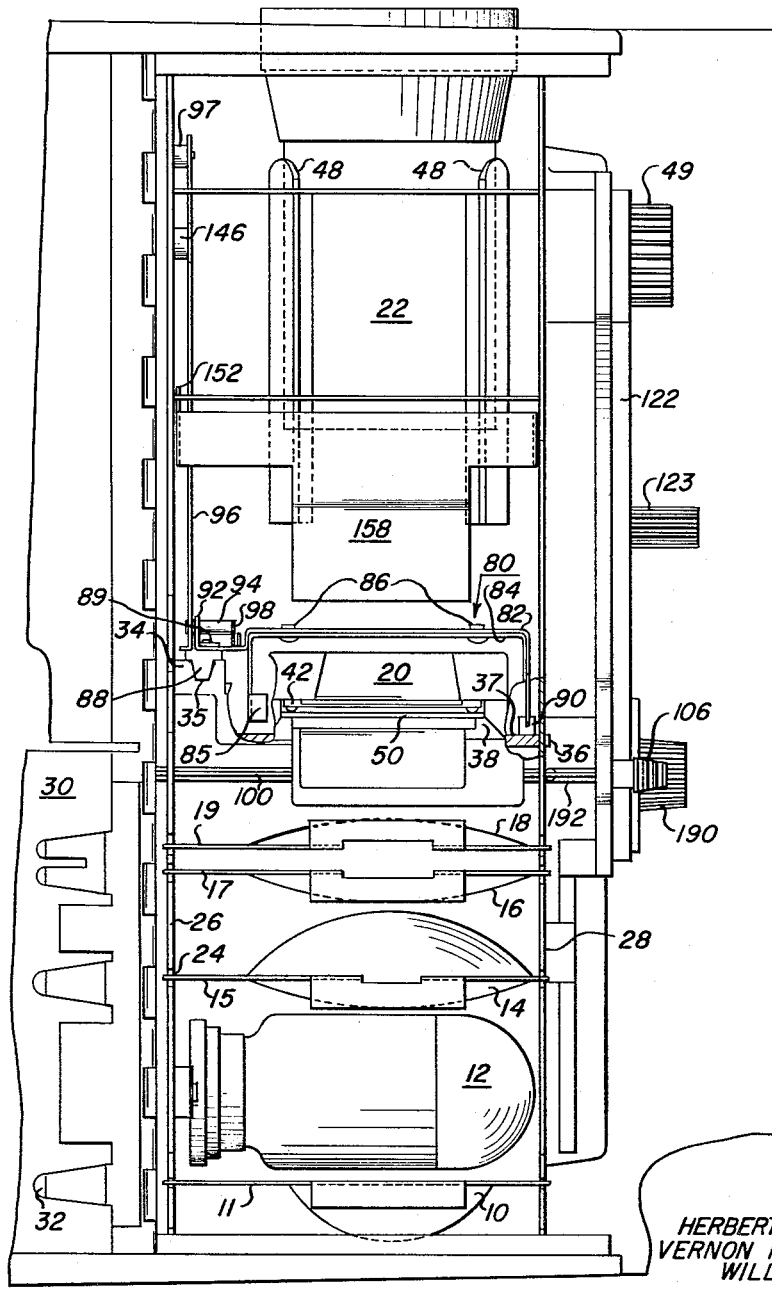
FIG. 6 is a top view of a portion of the projector showing the lens and gate systems.

Referring to FIG. 6, the projector elements that are located along the optical axis include a reflector 10, a projection lamp 12, a series of condenser lenses 14, 16 and 18, a gate designated generally at 20 and a focusing unit 22. The reflector and condenser lenses are mounted in respective frames 11, 15, 17 and 19 that are supported in slots such as 24 in a pair of side walls 26 and 28. The reflector and condenser lenses are easily removable for cleaning or interchanging when a top cover 30 of the machine is folded back as shown in FIG. 6. When cover 30 (see also FIG. 1) is closed over the machine, a series of spring fingers such as 32 (see also FIG. 7), cooperate with the top surfaces of the corresponding frames 11, 15, 17 and 19 to retain the reflector and condenser lenses tightly in their seated positions.

Figure 9:
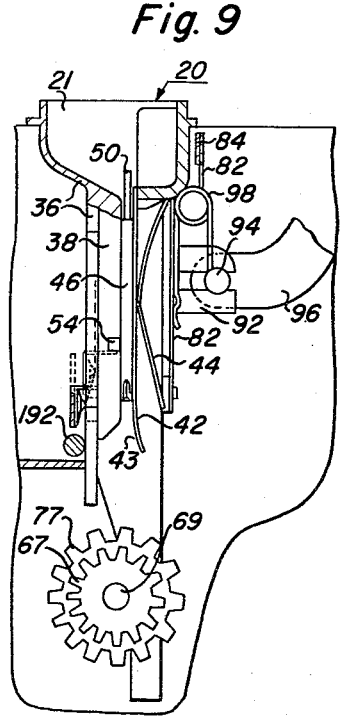
FIG. 9 is a sectional left side view of the gate, the elevator and editing mechanisms and the indexing pinions.

Referring to FIGS. 6 to 9, gate 20 comprises a backing plate 36 having a pair of forwardly extending vertical flanges 38 (see also FIG. 2) that flank an aperture 40. A pressure pad 42 is urged against flanges 38 by a spring member 44. The pressure pad 42 and spring 44 are each in the general form of an open square surrounding aperture 40. The pressure pad is bent forward at 43 (FIG. 9)

to form a camming surface for insertion of a slide holder such as 46 between it and the flanges 38.

The focusing unit 22 (FIG. 6) is mounted on a plurality of rails 48 for longitudinal movement thereon under control of a focusing knob 49.

The lamp, reflector, condenser lenses, gate and focusing unit are well known in the art and are shown and described here merely in orientation to the other elements of the projector that embody the invention.

A slide-changing cycle may be carried out by rotation of a handcrank in either of two directions. The only difference in the cycles, as between the two directions of handcrank rotation, is the direction in which the slide magazine is indexed, one direction being designated as forward indexing and the other as reverse indexing. By convention, movement of the slide magazine from the front to the rear of the projector will be designated as forward indexing.

A slide-changing cycle also may be initiated and thereafter carried out automatically by manual depression of a push button, during which cycle the slide magazine is indexed only in the forward direction. If the push button is held down, slide-changing cycles follow each other in rapid succession, thereby permitting a "scanning" action with respect to viewing the slides in the magazine.

A third means for initiating a slide-changing cycle, during which only forward indexing occurs, comprises a knob for selecting any of a plurality of cycle times, such as 4, 8 and 16 seconds. However, automatic operation at any selected cycle time may be overridden either by push button operation for forward indexing or by handcrank operation for indexing in either direction. Also the handcrank may be held stationary to block a slide change which would otherwise occur in automatic operation.

A manual indexing knob is provided for indexing the magazine in either direction in the projector. In order to prevent interference between two slides in a single compartment of the magazine, the indexing knob is interlocked with the handcrank so that manual indexing can be performed only when all of the slide holders are in the magazine. A separate emergency release mechanism is provided to release the magazine from the indexing mechanism regardless of the position of the handcrank in case there is a jam in the projector due to a bent slide holder or the like.

An editing lever is provided for raising a slide holder from the gate position to a higher position where the slide in the holder can be removed manually from the projector through an aperture in the cover of the machine. This permits individual slides to be replaced or reoriented without moving the magazine in the projector.

A single motor is provided both for automatic and push button slide changing and for operation of a ventilating blower. The blower circulates air through a preheating duct and through louvres in the bottom of a magazine for preheating and drying the slides in the magazine, thereby preventing the transparencies from "popping" to an unfocused position when they are later subjected to the elevated temperature which exists in the gate due to the projection lamp.

*Slide holders and magazines*

The slide holders and magazines used in the present projector are disclosed and claimed in the copending application Serial No. 676,290, filed August 5, 1957, by Robinson and Jungjohann, now Patent Number 2,919,021.

Referring to FIG. 3, each slide holder 46 comprises a U-shaped channel frame having leaf springs such as 52 for retaining a slide 50 that is inserted into the channel. A pair of orienting ears 54 are located on one side of the channel frame and extend perpendicularly to the plane of the holder. Ears 54 are employed, as fully described in the above mentioned application, for permitting each slide holder to be inserted into the magazine 60 in only one front-and-back orientation. The orienting ears 54 cooperate with a series of compartment separators comprising relatively long ribs 62 on one side of the magazine and relatively short ribs 64 on the opposite side of the magazine. The respective lengths of ribs 62 and 64 are such that a slide holder can be entered into the magazine only with ears 54 on the same side of the magazine as ribs 64. If an attempt is made to enter a slide holder into the magazine in a reverse orientation, such as at 50a, ears 54 engage the longer ribs 62 and block further entry of the holder. Although two orienting ears are shown, the same result can be achieved by using only one such ear.

A pair of lifting ears 56 on each slide holder are laterally spaced at the top of the holder and extend outwardly in the plane thereof. Ears 56 cooperate with the elevator mechanism, as hereinafter described, for transferring slides between the magazine and projector gate.

A rack 66 is integral with one side of magazine 60 and cooperates with a pinion 67 (FIGS. 7 and 9), which is the smaller of two indexing pinions, 67 and 77. Both pinions are mounted on an indexing shaft 69 that is driven by the indexing mechanism, as later described, for indexing the magazine within the projector. The pitch of rack 66 (FIG. 3) corresponds to the spacing of successive ribs 62 and 64, such that longitudinal movement of a magazine by an incremental distance of one rack tooth aligns the projector gate with a next compartment of the magazine.

Figure 7:
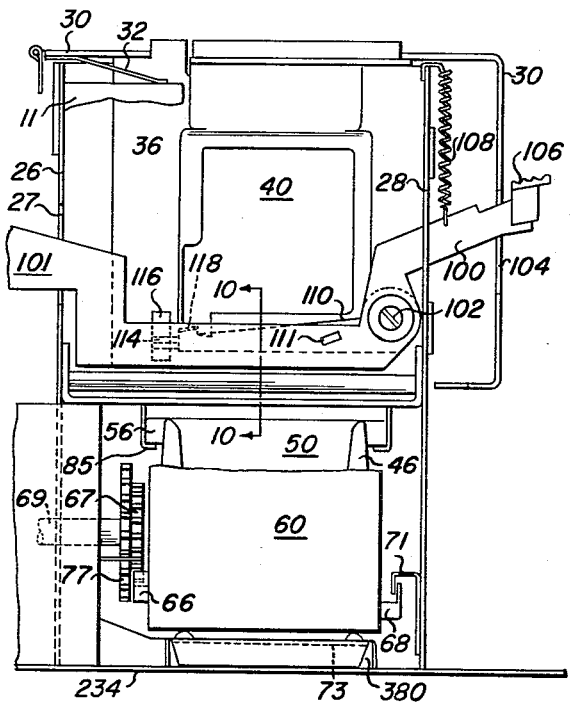
FIG. 7 is a rear view of the gate, editing mechanism and indexing pinions.

The magazine and holder shown in FIG. 3 may be considered as the cardboard-slide magazine and holder, in which the rack pitch and compartment spacing are relatively short. In FIG. 4, a second magazine, designated 70, is provided with a rack 76 having a relatively long pitch. The spacing between successive separator ribs 72 and 74 corresponds to the longer pitch of rack 76. Also, rack 76 is located lower on magazine 70 than the corresponding rack 66 on magazine 60 (FIG. 3) and extends further out from the magazine, so that when magazine 70 is inserted into the projector, rack 76 engages pinion 77 (FIGS. 7 and 9). The thicker compartments of magazine 70 permit the latter magazine to receive thicker slide holders which, in turn, are adapted to receive either cardboard or glass slides.

A respective guide 68 and 78 (FIGS. 3 and 4) is located on each magazine 60 and 70 on the side opposite the rack and cooperates with a longitudinal bracket 71 (FIG. 7) in the projector for guiding the magazine through the projector.

In FIG. 5, which is a bottom view of a magazine, it will be seen that each magazine has a series of louvres 79 spaced along its base to cooperate with a preheating duct in a manner hereinafter described.

*Elevator assembly*

The present projector includes an elevator which, during a slide-changing cycle, lowers a slide holder from the gate to the magazine and lifts a next slide holder to the gate for projection.

Referring to FIGS. 2, 6, 8 and 9, the elevator assembly, indicated generally at 80, comprises a guiding member 82 and a lifting member 84 that are riveted or otherwise secured together as at 86. The outer and front member 82 is employed for guiding the elevator in a vertical path between the magazine and the gate, while the inner and rear member 84 is employed for raising and lowering slide holders.

The backing plate 36 of the gate has a forwardly extending vertical flange 34 located along its inward side. Flange 34 has a vertical channel 35 that cooperates with a pair of upper and lower shoes 88 mounted on the guiding member 82 by respective clip washers 89. The outer, forward edge of backing plate 36 forms a sliding surface 37 that cooperates with a third shoe 90 mounted on member 82. Shoes 88 and 90, which preferably are formed of nylon or the like, guide the elevator assembly up and down on channel 35 and surface 37, respectively.

An arm 92 having a bifurcated tip projects forward from the guiding member 82 and is adapted to receive a stub shaft 94 which is integral with one end of an elevator lever 96. The other end of lever 96 is pivoted at 97 on the previously mentioned inner vertical wall 26 of the projector. A hairpin spring 98 is secured between stub shaft 94 and member 82 at a position between the guide shoes 88 and 90. Spring 98 forces shoes 88 and 90 against the vertical channel 35 and the guide surface 37, respectively, and maintains the entire elevator assembly in a vertical plane. Lever 96 is reciprocated about pivot 97, as hereinafter described, for moving the elevator assembly up and down.

Figure 8:
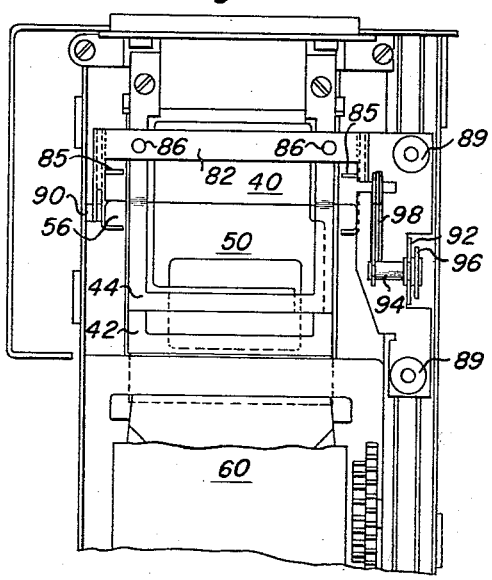
FIG. 8 is a front view of the gate, the elevator and shutter mechanisms and the indexing pinions.

The lifting member 84 of the elevator, which moves with the guiding member 82, has a pair of lifting brackets 85 on each side thereof. Brackets 85 engage the previously described lifting ears 56 of slide holders 46, as best shown in FIGS. 7 and 8, for transferring the slide holders from the magazine 60 to the projector gate and vice versa.

Editing mechanism

In order to permit slides to be withdrawn and replaced at the gate position of the projector, an editing mechanism is provided for lifting a slide holder from the projecting position to a position where the slide therein can be removed manually from the projector.

Figure 10:
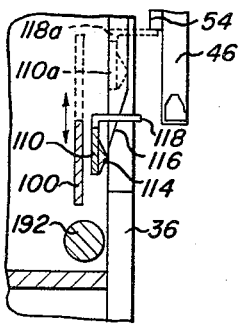
FIG. 10 is a detailed sectional side view of a portion of the editing mechanism taken along line 10—10 of FIG. 7.

The editing mechanism is shown best in FIGS. 7, 9 and 10 and includes a lever 100 pivoted at 102 on the backing plate 36 of the gate. The righthand side of lever 100, as viewed in FIG. 7, extends through a vertical slot 104 in the machine cover 30 and has a finger piece 106 (see also FIGS. 1 and 6) by means of which the lever can be rocked clockwise about pivot 102 against the tension of a coil spring 108. A camming lever 110 is pivoted at 102 and is secured to lever 100 at a position 111 which is on the opposite side of pivot 102 from spring 108. Lever 110 is formed of spring steel or the like and its left end, as viewed in FIG. 7, is sprung away from lever 100. A sliding tip 114 on lever 110 bears against a camming surface 116 on backing plate 36 of the gate and normally maintains lever 110 in parallel relation to lever 100, as shown in solid lines in FIG. 10. When lever 100 is rocked clockwise (as viewed in FIG. 7) lever 110 rockets clockwise with it, and as tip 114 rises, it slides to the right (as viewed in FIG. 10) along camming surface 116. An ear 118, near the tip of lever 110 also moves to the right and engages the ear 54 of the slide holder 46 that is in the projector gate, then lifts the slide holder above its gate position. When lever 110 has been raised to the position shown in broken lines at 110a, the top of slide 50 in the slide holder is raised to the position shown in FIG. 9. The top portion of gate 20 is flared out, as shown at 21 (FIGS. 1 and 9), to form a recess so that the raised slide can be removed manually from the projector. When a slide is removed from the projector in this manner, the elevator brackets 85 (FIG. 8) cooperate with the lifting ears 56 of the slide holder to retain the latter in the gate.

Handcrank drive

The previously described elevator, as well as a shutter and a cyclic magazine indexing mechanism, are at all times driven through a handcrank shaft. In turn, the handcrank shaft may be driven either directly by a handcrank or indirectly by a motor.

Figure 1:
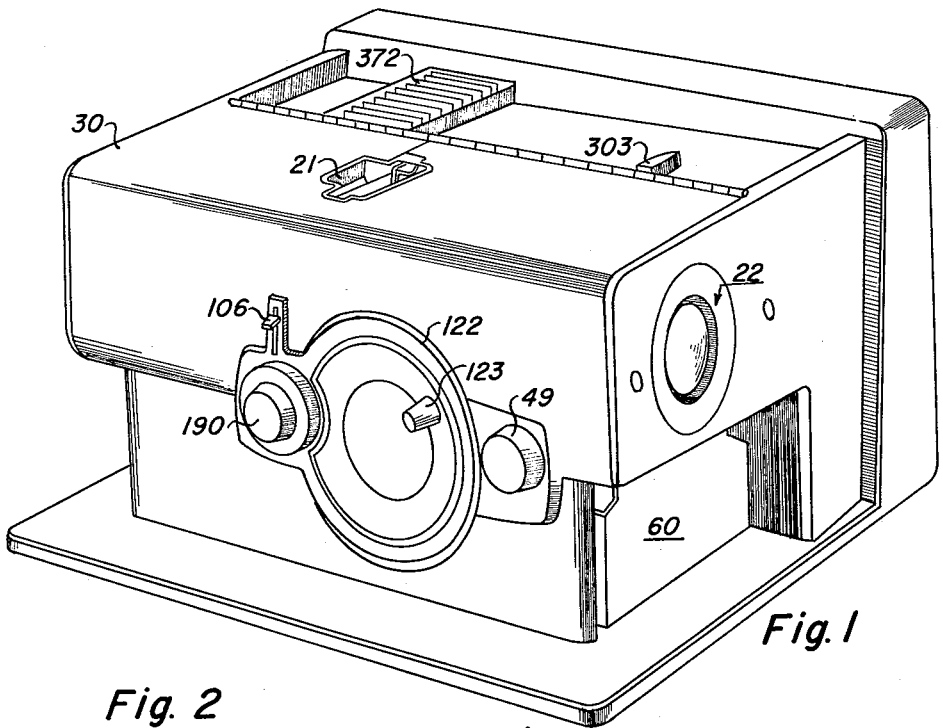
FIG. 1 is a perspective view of the overall slide projector.
Figure 2:
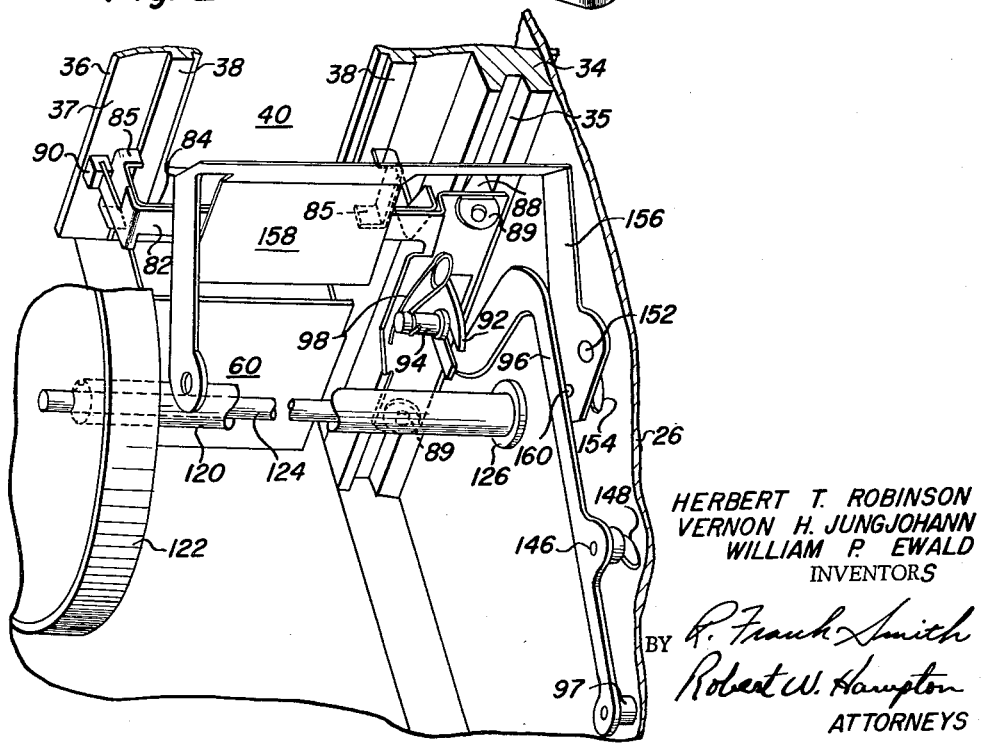
FIG. 2 is a perspective view of the handcrank shaft and the mechanisms for moving the elevator and the shutter, taken from the upper left front of the projector.

Referring to FIG. 2, the handcrank shaft is shown at 120. This shaft is keyed to the handcrank, shown at 122 (see also FIGS. 1 and 6), and is hollowed to receive a clutch shaft 124 described hereinafter. The handcrank is operated by an offset knob 123 which is secured thereto. Shaft 120 is supported in a bearing 126 in the previously described vertical wall 26. On the opposite side of wall 26, shaft 120 is keyed to a gear 130 (FIGS. 11 and 13). Gear 130 meshes with a gear 138 that is secured to a shaft 140. A programming wheel 142 also is secured to shaft 140. The ratio of gears 130 and 138 is unity; therefore, wheel 142 rotates once for each rotation of the handcrank. A box cam 144 is formed in the programming wheel 142 on the face of the wheel adjacent to wall 26. A follower 146 engages cam 144 and extends through a slot 148 in wall 26. On the other side of wall 26, follower 146 is secured to the elevator lever 96. The shape of cam 144 is such that during one complete rotation of the programming wheel 142, lever 96 is reciprocated in its own vertical plane about its pivot 97 (FIG. 2) to first lower the elevator to magazine 60 and then raise it to the gate position.

Shutter

The programming wheel 142 (FIG. 13) also operates a shutter during each rotation of the handcrank. The periphery of wheel 142 has a flat camming surface 150 that cooperates with a follower 152 extending through a slot 154 in wall 26. A hairpin spring 151, mounted on a first projection 153 of wall 26, is secured between follower 152 and a second projection 155 of the wall and maintains the follower in contact with camming surface 150 on the programming wheel 142. On the other side of wall 26 (FIGS. 2, 6 and 11) follower 152 is secured to a shutter bracket 156, integral with which is the shutter, indicated at 158. Bracket 156 is pivoted on wall 26 at 160.

During each rotation of the handcrank and the programming wheel 142, the shutter bracket 156 is rocked down and then up about its pivot 160 (FIG. 2). The location of camming surface 150 (FIG. 13) with respect to the contour of box cam 144 is such that the shutter is lowered to a position where it lies in front of the gate aperture 40, just prior to the lowering of the elevator, and is raised from that position just after the elevator places a next slide holder in the gate. Therefore, no movement of the slides is projected.

Cyclic indexing

Each rotation of the handcrank indexes the magazine in the projector by an incremental distance corresponding to the spacing of successive compartments in the magazine. As previously explained, the ultimate movement of the magazine is accomplished by a pinion 67 or 77 (FIG. 7), depending on the type of magazine, acting in cooperation with a rack 66 or 76 (FIGS. 3 and 4) on the magazine. During each rotation of the handcrank, an incremental rotation is imparted to both pinions 67 and 77 in the following manner.

A Geneva wheel 162 (FIGS. 11 and 13) is keyed to the handcrank shaft 120 and a Geneva drive pin 164 is secured to the previously described gear 130 on shaft 120. Wheel 162 and pin 164 cooperate with a star wheel 166 that is mounted for free rotation on a stub shaft 168. A gear 170 secured to star wheel 166 meshes with a gear 172 (see also FIG. 14) rotatably mounted on the previously described pinion shaft 69. A driving member 176 of a multiple-tooth clutch 180 is rotatably mounted on shaft 69 and is secured to gear 172. A driven member 178 of clutch 180 is secured to shaft 69, which is supported in the vertical wall 26. A coil spring 182 is mounted on a hub 173 of gear 172 and is compressed between gear 172 and a vertical plate 184 that supports hub 173. Spring 182 normally forces the driving member 176 of clutch 180 into engagement with the driven member 178 thereof and thereby normally completes a drive train between the handcrank and the pinion shaft 69. The Geneva drive pin 164 (FIG. 13) rotates star wheel 166 and gear 170 once during each rotation of the handcrank. The ratio of gears 170 and 172 is such that during one rotation of the handcrank, shaft 69 (FIG. 14) is rotated by an angular increment corresponding to one tooth of either pinion 67 or 77 (FIG. 7). The angular position of pin 164 (FIG. 13) on gear 130 is such that the cyclic indexing action occurs at approximately the mid-point of the handcrank rotation, at which time the elevator is fully down. Therefore, as magazine 60 (FIG. 7) is indexed, the lifting ears 56 of a next slide holder 46 move into cooperative relation with the fully down elevator brackets 85, so that the said next slide holder is in a position to be lifted by the elevator during the second half of the handcrank rotation.

*Manual indexing*

Manual indexing is accomplished by first disengaging the indexing clutch 180 (FIG. 14) and then rotating the driven member 178 of that clutch under manual control and independently of the driving member 176 of the clutch.

A manual indexing knob 190 (FIGS. 1, 6 and 20) is secured to a shaft 192 (FIGS. 6, 9, 11 and 14) that is supported for longitudinal sliding motion in holes in the two vertical walls 26 and 28 (FIGS. 6 and 14). On the side of wall 26 opposite the gate, a gear 194 (FIGS. 11, 13 and 14) is secured to shaft 192. Gear 194 has a large hub 196 with a flange 198 that engages, in rotary sliding relation, an extended face 175 of gear 172. When the manual indexing knob 190 (FIG. 1) is pushed toward the center of the machine, shaft 192 and gear 194 (FIGS. 11, 13 and 14) move with the knob, and flange 198 pushes gear 172 to the right (as viewed in FIG. 14) against the tension of spring 182, disengaging the indexing clutch 180. Therefore, when the indexing knob has been pushed toward the center of the machine, it may be turned for rotating gears 194 and 179 and the indexing shaft 69 independently of the handcrank, thereby moving the magazine as far as desired in either direction. When the indexing knob is released subsequently, spring 182 forces gear 172, gear 194, shaft 192 and the indexing knob 190 (FIG. 1) back to their initial positions. Pointed teeth such as 181 (FIG. 14) on the driving and driven members of clutch 180 cam each other rotationally so that the clutch always engages in a full-cycle position.

In order to prevent the magazine from being indexed when the elevator is in any position except fully down, the manual indexing knob is interlocked with the handcrank and can be pushed toward the center of the projector only when the handcrank is in its half-cycle position. At this time the elevator is fully down and all slide holders are in the magazine; therefore, the operator cannot jam the machine by attempting to place two slide holders in a single compartment of the magazine simultaneously.

Referring to FIGS. 1 and 20, the manual indexing knob 190 overlaps the handcrank 122. An arcuate recess 125 in the handcrank is aligned with knob 190 only when the handcrank is in its half-cycle position and the knob can therefore be depressed only at that time. At all other positions of the handcrank, examples of which are shown in FIGS. 22 and 23, the rim of knob 190 overlies the rim of the handcrank and the knob cannot be depressed.

*Emergency index release*

Since in the present projector it is possible for a bent slide holder to jam in the gate or some other jamming malfunction to occur when the elevator is not in its fully down position, there is provided an emergency means for disengaging the indexing clutch regardless of the position of the elevator.

Referring to FIGS. 11, 13 and 14, a lever 200 is pivoted at 202 on a transverse vertical wall 204 of the projector. Lever 200 has an upper horizontal arm 201 extending through a slot 206 in wall 26. A finger piece 208 is mounted on the end of arm 201. A vertical arm 203 of lever 200 connects arm 201 to a lower horizontal arm 205 from which an ear 214 extends perpendicularly to the plane of the lever into contact with the previously described extended surface 175 of gear 172. A spring 210 is secured between wall 26 at 215 and an ear 212 of arm 203. Depression of finger piece 208 on arm 201 rocks lever 200 counterclockwise (as viewed in FIG. 14) against the tension of spring 210 and moves ear 214 and gear 172 to the right, thereby disengaging the indexing clutch 180. It will be noted that the operation of lever 200 disengages clutch 180 even though the indexing knob 190 (FIG. 1) cannot be depressed. Therefore, the magazine can be removed manually from the projector in order to effect necessary repairs or adjustments. Since gear 194 (FIG. 14) is always in mesh with the wide gear 179 even though the index knob is not depressed, that knob can be used in conjunction with lever 200 for removing the magazine from the projector.

*Motor drive*

For push button or automatic slide changing, the handcrank shaft 120 (FIGS. 2, 11 and 13) is driven by a motor through a spring clutch, the previously metnioned clutch shaft 124, a handcrank clutch and the handcrank shaft 120.

Figure 15:
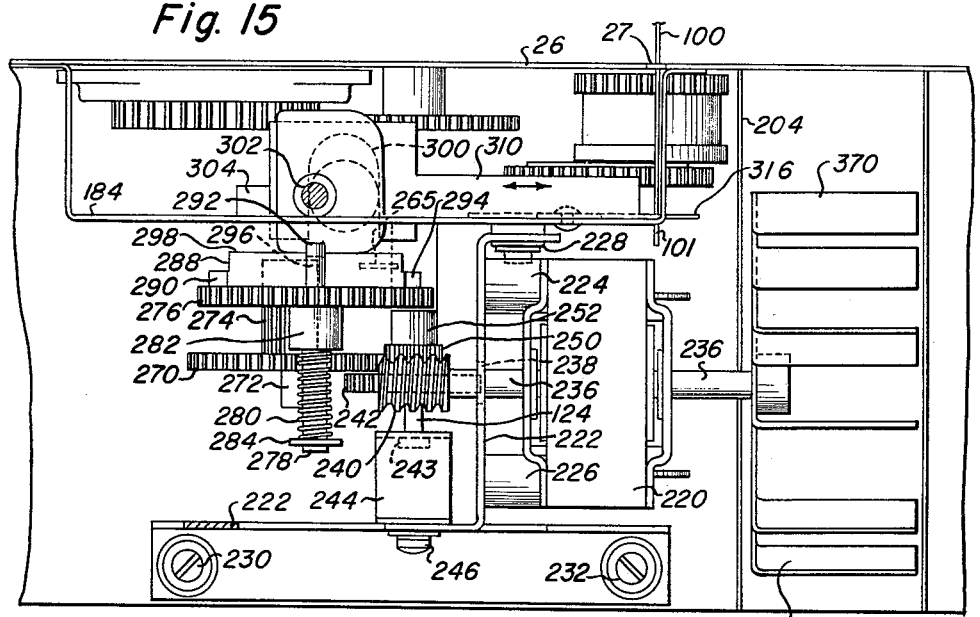
FIG. 15 is a top view of the motor drive gear train, the timing selector and the blower.
Figure 16:
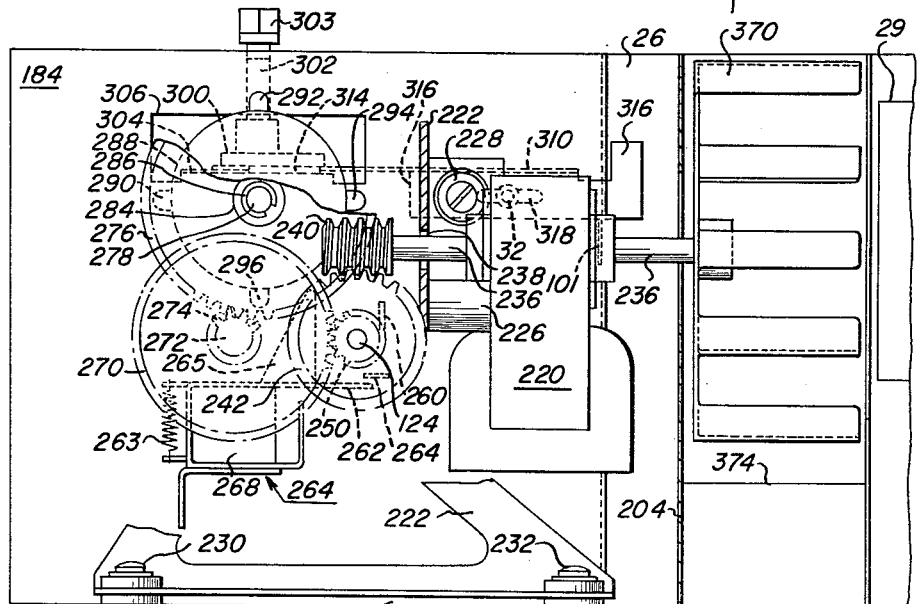
FIG. 16 is a right side view of the mechanism shown in FIG. 15.

Referring to FIGS. 15 and 16, the projector motor is shown at 220 and is mounted on a vertical angle frame 222 by a pair of posts 224 and 226. Frame 222 is secured at 228 to the previously described vertical wall 184 and is secured at 230 and 232 to the projector base, shown at 234 in FIG. 16. The motor shaft, shown at 236, extends both to the right and to the left of the motor, as viewed in FIGS. 15 and 16. The lefthand portion of the motor shaft extends through an aperture 238 in frame 222.

A worm 240 is secured to the left end of the motor shaft and meshes with a worm gear 242 which rotates freely on the clutch shaft 124. The end of the clutch shaft is supported in a bearing 243 which is mounted in a bracket 244. The bracket is supported at 246 on frame 222.

A pinion gear 250 and a hub 252 are integral with worm gear 242 and rotate freely on clutch shaft 124. Pinion gear 250 is employed, as later described, during automatic slide changing. Hub 252, best shown in FIG. 11, is keyed to a sleeve 254 which rotates freely on shaft 124. Sleeve 254 and a second sleeve 256, the latter being secured to shaft 124, have respective step-down diameters in abutting relation. The step-down diameters of sleeves 254 and 256 are tightly journalled in a coil spring 258, one end of which is secured to sleeve 256 and the other end of which extends tangentially from the sleeves at 260 (FIGS. 11, 12 and 16).

Sleeves 254 and 256, with spring 258, form a spring clutch of a type well known in the art. When the free end 260 of spring 258 is permitted to rotate, the spring tightly clamps sleeves 254 and 256 together and therefore completes a drive train from the motor 220 to the clutch shaft 124. When the free end 260 of spring 258 is held stationary, the coils of the spring become loose and sleeve 254 rotates within those coils and does not drive sleeve 256 and shaft 124.

Referring to FIG. 12, the mechanism provided for selectively holding or releasing the free end 260 of spring 258 comprises an armature plate 262 of an electromagnet 264. Plate 262 has a cut-out portion 266 forming a hook that engages spring end 260 when and only when the armature is in its raised, or counterclockwise position (as viewed in FIG. 12). A coil spring 263 (FIGS. 12 and 16) normally maintains the armature plate 262 in its counterclockwise position against a stop 264 (FIG. 16), where it holds the spring end 260 of the clutch. When a coil 268 of electromagnet 264 is energized, the armature plate 262 is lowered to its clockwise position against the coil, as shown in FIG. 16, and permits spring end 260 of the clutch to rotate and thereby engage the clutch for driving shaft 124. When shaft 124 is driven, it normally drives the handcrank shaft 120 (FIGS. 2 and 11) through a handcrank clutch hereinafter described, and thereby drives the elevator, shutter and cyclic indexing mechanism in the manner previously set forth.

By means of a push-button switch, described later, coil 268 of electromagnet 264 (FIGS. 12 and 16) can be energized for any desired length of time. If the coil is energized only momentarily, as is the usual case, the armature plate 262 is released from its clockwise position (FIG. 16) before spring 258 (FIG. 11) has completed one rotation; therefore, plate 262 re-engages spring end 260 after the first full rotation of spring 258, thereby disengaging the spring clutch. If coil 268 remains energized during more than one rotation of spring 258, the spring clutch remains engaged during a corresponding number of rotations, but is always disengaged at its full cyclic position.

*Automatic slide changing*

The projector embodying the present invention includes means independent of coil 268 (FIGS. 12 and 16) for actuating the armature plate 262 of the electromagnet 264 to thereby engage the spring clutch. The independent actuating means is operable automatically at any of a plurality of selected frequencies.

The previously described pinion gear 250 (FIGS. 15 and 16), which is integral with worm gear 242, meshes with a gear 270 that is mounted for free rotation on a shaft 272. A pinion gear 274 is integral with gear 270 and meshes with a gear 276 that is mounted for free rotation and sliding movement on a shaft 278. Shafts 272 and 278 are secured to the previously described vertical wall 184. A coil spring 280 (FIG. 15) is compressed between a hub 282 of gear 276 and a washer 284 which is retained near the free end of shaft 278 by a spring clip 286 (FIG. 16). A timing wheel 288 is integral with gear 276 and has a flat face 298 cooperating with a rectangular cam 300. The latter cam is rotatably mounted by a post 302 on a horizontal flange 304 of wall 184 and extends through a rectangular aperture 306 in wall 184 for contact with the face 298 of timing wheel 288. Post 302 has a knob 303 (FIGS. 1 and 16) for manual rotation, and is offset with respect to the center of cam 300. Rotation of post 302 and cam 300 by means of knob 303 presents the four edge surfaces of the cam to timing wheel 288 and causes the timing wheel and gear 276 to assume four different axial positions along shaft 278, as shown in FIGS. 15, 17, 18 and 19, respectively. Spring 280 (FIG. 15) maintains gear 276 and wheel 288 tightly against the presented edge surface of cam 300 and therefore acts as a detent for holding the rotated setting of the cam.

The timing wheel 288 has four lobes 290, 292, 294 and 296 equally spaced around its periphery. Each lobe 290 and 294 extends one predetermined unit of distance toward wall 184 from the face of gear 276; lobe 296 has a length of approximately two such units; and lobe 292 has a length of approximately three units. The lobes on wheel 288 are adapted to cooperate with a vertical arm 265 on the armature plate 262 of electromagnet 264. Arm 265 is best shown in FIG. 12 but is also shown in FIGS. 15 to 19. In FIG. 16 it will be seen that the tip of arm 265 is located in such a vertical position that it will engage any of the lobes on wheel 288 which are aligned therewith in a vertical plane. When a lobe engages arm 265, it temporarily rocks the armature plate 262 clockwise, as viewed in FIG. 16, thereby engaging the spring clutch for one cycle of operation.

When cam 300 is positioned as shown in FIG. 15, it locates the timing wheel 288 axially along shaft 278 in such a position that only the two longest lobes 292 and 296 engage arm 265. Lobes 292 and 296 are diametrically opposed on wheel 288; therefore, a slide changing cycle occurs at two evenly spaced times during one rotation of the timing wheel. The ratios of the various pairs of gears 240, 242, 250, 270, 274 and 276 may be chosen to cause the timing wheel to rotate in any desired amount of time. In the projector shown, the timing wheel rotates every sixteen seconds. Therefore, when cam 300 is set as shown in FIG. 15, a slide changing cycle occurs every eight seconds.

Figure 17:
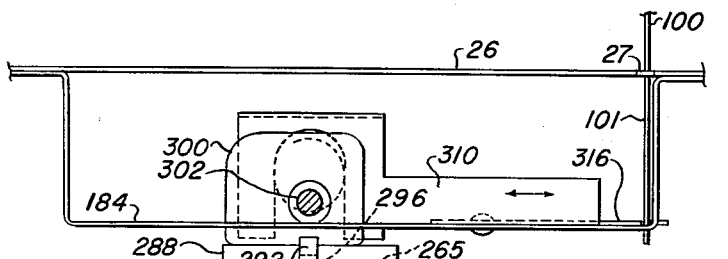
FIG. 17 is a top view of the timing selector with the timing cam in a second position.
Figure 18:
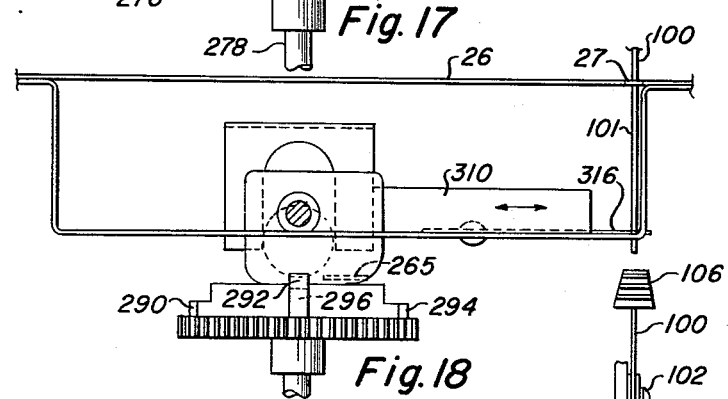
FIG. 18 is a top view of the timing selector with the timing cam in a third position.
Figure 19:
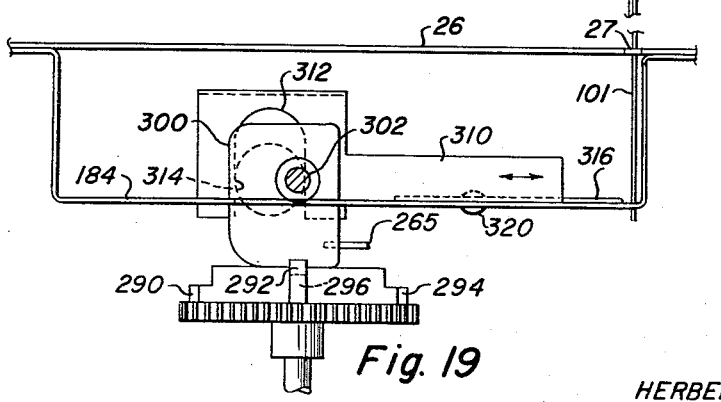
FIG. 19 is a top view of the timing selector with the timing cam in a fourth position.

By setting cam 300 to the position shown in FIG. 17, all four lobes on the timing wheel are aligned vertically with arm 265 of armature plate 262, so that each of the lobes initiates a slide changing cycle and one cycle is initiated every four seconds. When cam 300 is set as shown in FIG. 18, only the longest lobe 292 of the timing wheel engages arm 265 and a slide changing cycle is initiated only once during each rotation of the timing wheel, or every sixteen seconds. Finally, when cam 300 is set as shown in FIG. 19, none of the lobes on the timing wheel are vertically aligned with arm 265 and no automatic slide changing can occur. The latter position of cam 300 is designated "Manual."

*Editing interlock*

It is desirable to prevent operation of the previously described editing lever during automatic slide changing. This insures that no interference will occur between the editing mechanism and the elevator mechanism if the latter should be operated automatically while the former is being operated manually. In order to prevent such misoperation, the editing lever is interlocked with cam 300 (FIGS. 15 to 19) in such manner that depression of the editing lever is positively blocked except when cam 300 is set to its "Manual" position.

A horizontal plate 310 (FIG. 15) is positioned between cam 300 and flange 304 of wall 184. Plate 310 has a U-shaped slot 312, best shown in FIG. 19 where the U is inverted. Slot 312 is adapted to receive a circular disk-shaped projection 314 on the bottom of cam 300. Projection 314 is offset with respect to the center of cam 300 and with respect to the turning axis 302 of that cam; therefore, rotation of the cam moves plate 310 to the right and left as shown by the double arrows in FIGS. 15 to 19. Plate 310 has a vertical flange 316 with a slot 318 (FIG. 16) through which it is secured to the vertical wall 184 by a pin 320. Slot 318 permits plate 310 to slide back and forth along wall 184.

The editing lever 100 (FIGS. 7, 15 and 17 to 19) has a foot 101 that extends through a slot 27 in vertical wall 26 and cooperates with the vertical flange 316 on plate 310. When cam 300 is in any position (FIGS. 15, 17 and 18) other than "Manual" (FIG. 19), flange 316 of plate 310 overlies the foot 101 of lever 100 and prevents that lever from being depressed and rocked about its pivot 102.

*Handcrank clutch*

It will be recalled that during either of the two modes of power operation, i.e., push button or automatic operation, the elevator, shutter and cyclic indexing mechanisms are driven by the projector motor 220 (FIG. 15) through the clutch shaft 124 (FIG. 2), a handcrank clutch and the handcrank shaft 120.

The handcrank clutch is essentially a unidirectional clutch which permits the handcrank 122 to be rotated in either direction for manual slide changing, without driving the clutch shaft 124, but permits the clutch shaft to drive the handcrank and the handcrank shaft 120 in the direction for forward indexing during either mode of power operation. In order to prevent the projector motor from stalling in the event of a jam in any of the cyclic mechanisms that are driven by the handcrank shaft 120, the handcrank clutch is disengaged when the handcrank is held stationary during power operation.

Referring to FIGS. 20 and 21, the handcrank knob 123 is rotatably secured to one end of a lever 330, the other end of which is pivoted on a stud 332 that is integral with the handcrank 122. A light hairpin spring 334 mounted on stud 332 has one end engaging an ear 336 on lever 330. The other end of spring 334 engages an ear 338 of a lever 340. Spring 334 lightly urges lever 330 clockwise about stud 332 and into engagement with a lever stop 331. Lever 340 is pivoted on a stud 342 which is integral with the handcrank, and lever 340 is urged clockwise about stud 342 by spring 334. An arm 344 on lever 340 engages an ear 335 on lever 330 to limit the clockwise rocking of lever 340. A pawl 346 is pivoted at 348 on lever 340 and is urged counterclockwise about its pivot by a coil spring 350 that is connected between lever 340 and an ear 352 on the pawl. Another ear 354 on pawl 346 engages a shoulder 356 on lever 340 to limit the counterclockwise movement of the pawl relative to lever 340. A single-tooth ratchet 360 in the form of a snail cam is secured to the end of clutch shaft 124 and has a step surface 362 adapted to cooperate with ear 354 on pawl 346.

During forward manual drive, clockwise movement of knob 123 rotates handcrank 122 clockwise, thereby rotating levers 330 and 340 and pawl 346 clockwise around ratchet 360. The inner edge of ear 354 on the pawl rides up the incline of the ratchet and then down the step surface 362 during each rotation of the handcrank and no drive is imparted to the clutch shaft 124 through the ratchet. An ear 354 on pawl 346 rides up the incline of ratchet 360, the pawl and its associated lever 340 are rocked counterclockwise as a unit about stud 342 against the tension of the light hairpin spring 334. The heavier coil spring 350 maintains ear 354 of the pawl in contact with shoulder 356 of lever 340.

During reverse rotation of the handcrank, counterclockwise movement of knob 123 at first rocks lever 330 counterclockwise about stud 332 until that lever engages a stop 337, as shown in FIG. 23. Further counterclockwise movement of knob 123 rotates the entire handcrank assembly counterclockwise around ratchet 360. Ear 335 on lever 330, engaging arm 344 of lever 340, rocks that lever and its associated pawl 346 counterclockwise about stud 342 against the tension of spring 334, thereby moving ear 354 of the pawl radially outward from the center of the handcrank so that the ear does not engage the step surface 362 of ratchet 360. Therefore, no drive is imparted to shaft 124 through the ratchet.

During power drive, which is always in the direction for forward indexing, ratchet 360 rotates clockwise with shaft 124. Step surface 362 of the ratchet normally engages ear 354 of pawl 346 and rotates the pawl, as well as lever 340, clockwise (FIG. 20). Arm 344 on lever 340, engaging ear 335 of lever 330 drives lever 330, stop 331, handcrank 322 and the handcrank shaft 120 clockwise with shaft 124.

If during automatic operation it is desired to retain a slide transparency in the projector gate for more than one cycle, the operator may hold knob 123 stationary with light manual pressure. The handcrank continues to rotate until lever 330 engages stop 337 (FIG. 23). Exactly as described above in connection with reverse handcrank operation, ear 335 on lever 330 rocks lever 340 and pawl 346 counterclockwise about stud 342 to thereby move ear 354 radially away from ratchet 360. Therefore, ear 354 is prevented from engaging the step surface 362 of the ratchet and no drive is imparted by the ratchet to the handcrank.

In the event that a jam occurs in the machine during a power operation, and handcrank 122 is thereby prevented from rotating, the handcrank clutch is disengaged in the following manner. Ratchet 360 which, until the jam occurs, drives ear 354 of pawl 346 clockwise through the step surface 362, continues to rotate and carries ear 354 with it. When the handcrank is stopped, ratchet 360 rocks pawl 346 clockwise about its pivot 348 against the tension of spring 350 and moves ear 354 tangentially and radially outward from the center of the hand crank until it clears the step surface 362, as shown in FIG. 22. Spring 350 then return ear 354 into contact with shoulder 356 of lever 340. As long as the jam persists and the power drive continues, the above described action recurs during each rotation of ratchet 360 by shaft 124.

*Preheating of slide transparencies*

When a slide transparency is transferred from a relatively cool magazine into the projection gate and one side of the transparency is subjected to heat from the projector lamp, it may warp out of its normal plane and therefore out of focus. This warping, known as "popping," is prevented in the present projector by preheating the slides while they are still in the magazine.

Air which passes over the projector lamp 12 (FIG. 6) then passes through a large aperture 29 (FIG. 16) in the vertical wall 26 and is drawn into a rotary blower 370 that is mounted on the righthand end of the motor shaft 236. Most of the air that enters the blower is exhausted upwardly through a series of vents 372 (FIG. 1) in the top of the projector. A minor portion of the air that enters the blower is directed downwardly, as shown by arrows in FIG. 25, and deflected by an inclined plate 374 (FIGS. 16, 24 and 25), past a resistance heater 376 and through an aperture 25 in wall 26 into a preheating duct 380.

Referring to FIG. 7, it will be seen that duct 380 comprises a chamber formed by the base 234 of the projector and a supporting plate 73 for the magazine 60 or 70. Plate 73 is bent downward at the sides, as shown at 75 in FIG. 25, to close the duct. A series of louvres 382 (FIG. 24) in plate 73 at the top of duct 380 underlie the previously described louvres 79 (FIG. 5) in the bottom of the magazine 60 or 70. Therefore, air directed downwardly from the blower 370 (FIG. 16) is heated at 376 (FIGS. 24 and 25) and passes through duct 380, through louvres 382 and 79 (FIG. 5) and through the slides in the magazine 60 or 70 for preheating the slides.

*Electrical circuit*

Referring to FIG. 26, power is supplied to the projector through a plug 390 and through a switch 392 having four contacts 396, 398, 400 and 402. Contact 396 is the "Off" contact and is not connected to the circuit. Contact 398 is connected through a lead 404, the resistance heater 376 (see also FIGS. 24 and 25) and a return lead 406 to plug 390. The projector motor 220 (see also FIGS. 15 and 16) is connected in parallel with heater 376 across leads 404 and 406. The coil 268 of electromagnet 264 (see also FIGS. 12 and 16) also is connected across leads 404 and 406 in series with the previously mentioned push-button switch, shown in FIG. 26 at 408. A pair of remote control terminals 410 and 412 are connected in parallel with the push-button switch 408 and may be used for completing the push button circuit through a remote control cord by means of a separate push button or under control of a recorded signal, in a manner well known in the art.

Contact 400 of switch 392 is connected through a dropping resistor 414 and through the projector lamp 12 (see also FIG. 6) to the return lead 406. Contact 402 is connected directly through a lead 416 and lamp 12 to lead 406.

Switch 392 has an arcuate switch blade 394 that is adapted to engage as many as three of the contacts 396, 398, 400 and 402, simultaneously. When blade 394 is in the position shown in FIG. 26 in solid lines, it engages only contact 396 and no power is supplied to any part of the projector circuit. When the switch blade is rotated one step clockwise, it engages both contacts 396 and 398, thereby energizing heater 376 and motor 220 and supplying power to the push button circuit. This initiates operation of the blower 270 (FIGS. 15 and 16), which is mounted on the motor shaft 236 as previously described. When switch blade 394 (FIG. 26) is rotated a further step clockwise it engages contacts 396, 398 and 400 and thereby not only energizes the heater, motor and push button circuits but also energizes lamp 12 through resistor 414. When switch blade 394 is rotated one final step clockwise, to the position shown in broken lines in FIG. 26, it engages contacts 398, 400 and 402, supplying power to lead 404 for the heater, motor and push button circuits, and supplying power to the projector lamp directly through lead 416, shorting out resistor 414.

The parameters of lamp 12 and resistor 414 are such that when power is supplied to the lamp through the resistor, the lamp operates at approximately 300 watts, and when power is supplied through lead 416 the lamp operates at approximately 500 watts. The two specified power levels are arbitrarily chosen and may, of course, be varied to suit requirements, but these levels permit the operator to select a lamp brightness that is commensurate with the density of a slide transparency and the size of a viewing screen in most practical situations.

We claim:

1. In a photographic slide projector, the combination comprising: means including a plurality of pinion gears of mutually different tooth pitch for receiving and indexing any of a predetermined plurality of different types of slide magazines, each of said types of magazines having a gear rack adapted to mesh with one and only one of said pinions; and means for imparting successive cyclic movements to said indexing means for moving said pinions incrementally, whereby any of said magazines inserted into said projector is indexed incrementally in response to each cyclic movement of said indexing means.

2. The combination defined in claim 1, wherein said pinion gears are centered on and mutually spaced along a single axis, with a drive shaft constituting a part of said indexing means, said shaft being disposed along said axis concentrically thereto and secured to each of said gears for imparting rotational movement to said gears and thereby imparting translational movement to any of said magazines inserted into said projector.

References Cited in the file of this patent

UNITED STATES PATENTS

| | | |
|---|---|---|
| 2,878,719 | Lutes | Mar. 24, 1959 |
| 2,900,074 | Windman | Aug. 18, 1959 |
| 2,909,962 | Goldberg | Oct. 27, 1959 |
| 2,931,115 | Pester et al. | Apr. 5, 1960 |